(12) United States Patent
Rauscher et al.

(10) Patent No.: US 6,878,787 B2
(45) Date of Patent: Apr. 12, 2005

(54) POLYAMIDE SUPPORTED METALLOCENE CATALYSTS

(75) Inventors: David John Rauscher, Angleton, TX (US); William John Gauthier, Houston, TX (US); Shady Nader Henry, Seabrook, TX (US); Kai Hortmann, Dilbeek (BE)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 10/648,716

(22) Filed: Aug. 26, 2003

(65) Prior Publication Data

US 2005/0049372 A1 Mar. 3, 2005

(51) Int. Cl.$^7$ .................................................. C08F 4/42
(52) U.S. Cl. .................. 526/160; 526/943; 526/303.1; 526/348; 526/904; 502/109; 502/117; 502/123; 502/125; 502/152; 502/103; 502/87
(58) Field of Search ................................. 526/160, 943, 526/303.1, 348, 904; 502/109, 117, 123, 125, 152, 103, 87

(56) References Cited

U.S. PATENT DOCUMENTS

| | | |
|---|---|---|
| 4,404,344 A | 9/1983 | Sinn et al. |
| 4,794,096 A | 12/1988 | Ewen |
| 4,892,851 A | 1/1990 | Ewen et al. |
| 4,975,403 A | 12/1990 | Ewen |
| 5,243,002 A | 9/1993 | Razavi |
| 5,416,228 A | 5/1995 | Ewen et al. |
| 5,942,586 A * | 8/1999 | Herrmann et al. .......... 526/160 |
| 5,945,365 A | 8/1999 | Reddy |
| 6,239,058 B1 | 5/2001 | Shamshoum et al. |
| 6,432,860 B1 | 8/2002 | Shamshoum et al. |

FOREIGN PATENT DOCUMENTS

EP 0881236 A1 12/1998

* cited by examiner

Primary Examiner—Ling-Sui Choi
(74) Attorney, Agent, or Firm—William D. Jackson

(57) ABSTRACT

Supported stereospecific catalysts and processes for the stereotactic propagation of a polymer chain derived from ethylenically unsaturated monomers such as the polymerization of propylene to produce syndiotactic polypropylene or isotactic polypropylene. The supported catalyst comprises a stereospecific metallocene catalyst component and a co-catalyst component comprising an alkylalumoxane. Both the metallocene catalyst component and the co-catalyst component are supported on a particulate polyamide support comprising spheroidical particles of a polyamide having an average diameter with the range of 5–60 microns, and a porosity permitting distribution of a portion of the co-catalyst within the pore volume of the polyamide particles while retaining a substantial portion on the surface of the particles. The polyamide support is characterized by relatively low surface area, specifically a surface area less than 20 square meters per gram. The metallocene component can take the form of a single metallocene or two or more co-supported metallocenes.

16 Claims, 2 Drawing Sheets

POLYAMIDE SUPPORTED METALLOCENE CATALYSTS

FIELD OF THE INVENTION

This invention relates to stereorigid metallocene catalysts supported on particulate polyamide supports and their use in the production of stereospecific polymers from ethylenically unsaturated compounds and, more particularly, to such catalysts incorporating spheroidal polyamide supports and their use.

BACKGROUND OF THE INVENTION

Stereospecific metallocenes can be characterized generally as coordination compounds incorporating cyclopentadienyl groups or derivatives thereof (which may be substituted or unsubstituted) coordinated with a transition metal. Various types of metallocenes are known in the art. They include bicyclic coordination compounds of the general formula:

$$(Cp)_2MeQ_n \tag{1}$$

characterized by the isospecific metallocenes as described below and cyclopentadienyl fluorenyl compounds of the general formula:

$$CpCp'MeQ_n \tag{2}$$

characterized by the syndiospecific metallocenes as described below. In the aforementioned formulas the Me denotes a transition metal and Cp and Cp' each denote a cyclopentadienyl group which can be either substituted or unsubstituted with Cp' being different from Cp, Q is an alkyl or other hydrocarbyl or a halo group and n is a number within the range of 1–3. The cyclopentadienyl groups are in a stereorigid relationship normally provided by a bridged structure between the metallocene groups (not shown in Formulas (1) and (2) above) although stereorigidity can be provided through substituent groups which result in steric hindrance, as described, for example, in U.S. Pat. No. 5,243,002 to Razavi.

Isospecific and syndiospecific metallocene catalysts are useful in the stereospecific polymerization of monomers. Stereospecific structural relationships of syndiotacticity and isotacticity may be involved in the formation of stereoregular polymers from various monomers. Stereospecific propagation may be applied in the polymerization of ethylenically unsaturated monomers such as $C_{3+}$ alpha olefins such as propylene, 1-butene, 4-methyl-1-pentene, 1-dienes such as 1,3-butadiene, substituted vinyl compounds such as vinyl aromatics, e.g., styrene or vinyl toluene, vinyl chloride, vinyl ethers such as alkyl vinyl ethers, e.g., isobutyl vinyl ether, or even aryl vinyl ethers. Stereospecific polymer propagation is of most significance in the production of isotactic or syndiotactic polypropylene and polybutene.

The structure of isotactic polypropylene can be described as one having the methyl groups attached to the tertiary carbon atoms of successive monomeric units falling on the same side of a hypothetical plane through the main chain of the polymer, e.g., the methyl groups are all above or below the plane. Using the Fischer projection formula, the stereochemical sequence of isotactic polypropylene is described as follows:

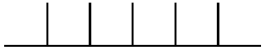

(3)

In FIG. 3 each vertical segment indicates a methyl group on the same side of the polymer backbone. Another way of describing the structure is through the use of NMR. Bovey's NMR nomenclature for an isotactic pentad as shown above is . . . mmmm . . . with each "m" representing a "meso" dyad, or successive pairs of methyl groups on the same said of the plane of the polymer chain. As is known in the art, any deviation or inversion in the structure of the chain lowers the degree of isotacticity and crystallinity of the polymer.

In contrast to the isotactic structure, syndiotactic polypropylene polymers are those in which the methyl groups attached to the tertiary carbon atoms of successive monomeric units in the chain lie on alternate sides of the plane of the polymer. Syndiotactic polypropylene using the Fisher projection formula can be indicated by racemic dyads with the syndiotactic pentad rrrr shown as follows:

(4)

Here, the vertical segments again indicate methyl groups in the case of syndiotactic polypropylene, or other terminal groups, e.g. chloride, in the case of syndiotactic polyvinyl chloride, or phenyl groups in the case of syndiotactic polystyrene.

Syndiotactic polymers are semi-crystalline and, like the isotactic polymers, are largely insoluble in cold xylene. This crystallinity distinguishes both syndiotactic and isotactic polymers from an atactic polymer, which is non-crystalline and highly soluble in xylene. An atactic polymer exhibits no regular order of repeating unit configurations in the polymer chain and forms essentially a waxy product.

SUMMARY OF THE INVENTION

In accordance with the present invention, there are provided supported stereospecific catalysts and processes for the stereotactic propagation of a polymer chain derived from ethylenically unsaturated monomers which contain three or more carbon atoms or which are substituted vinyl compounds, such as styrene and vinyl chloride. The preferred application of the present invention is in the stereospecific propagation of $C_3$–$C_4$ alpha olefins, particularly the polymerization of propylene to produce syndiotactic polypropylene. Another application of the present invention involves isospecific metallocene catalysts and their use in the polymerization of propylene to produce isotactic polymers, including homopolymers and copolymers, specifically, isospecific ethylene propylene copolymers. In carrying out the present invention, there is provided a supported metallocene catalyst comprising a stereospecific metallocene catalyst component and a co-catalyst component comprising an alkylalumoxane. The metallocene catalyst component incorporates a metallocene ligand structure having two sterically dissimilar cyclopentadienyl ring structures coordinated with the central transition metal atom. At least one of the cyclopentadienyl ring structures is a substituted cyclopentadienyl group which provides an orientation with respect to the transition metal atom which is sterically different from the orientation of the other cyclopentadienyl group. Both of the cyclopentadienyl groups are in a relationship with one another by virtue of bridge or substituent groups, which provide a stereorigid relationship relative to the coordinating transition metal atom to prevent rotation of said ring structures. Both the metallocene catalyst component and the co-catalyst component are supported on a particulate polyamide support comprising spheroidal particles of a polyamide having an average diameter within the range of 5–60 microns, preferably 10–30 microns, and a porosity permitting distribution of a portion of the co-catalyst component within the pore volume of the polyamide particles while retaining a substantial portion, preferably the predominate portion, of the co-catalyst on the surface of the support particles. This supported catalyst is contacted in a polymerization reaction zone with an ethylenically unsaturated monomer which contains 3 or more carbon atoms or which is a substituted vinyl compound under polymerization conditions to produce stereospecific polymerization of the monomer.

The metallocene component can take the form of a single metallocene or: can involve two or more metallocenes which are co-supported on the polyamide support. Such catalyst components incorporating two or more metallocenes can be employed to produce, for instance, syndiotactic or isotactic polymers having broad molecular weight distributions.

In a preferred embodiment of the invention, the supported metallocene catalyst incorporates a particulate polyamide support of a generally spheroidal configuration having an average diameter as described previously. The spheroidal polyamide incorporate an alkyl aluminum disposed predominantly on the outer particle surfaces. A stereospecific metallocene is supported on the polyamide support particles. In one application of the invention, the metallocene is an unbalanced metallocene having a ligand structure in which stereorigidity is imparted by means of a structural bridge extending between dissimilar cyclopentadienyl groups. The metallocene is preferentially supported on the outer surfaces of the polyamide particles to provide a predominance of the polymerization sites provided by the transitional metal atom on the exterior of the support particulate. The polyamide support is characterized by relatively low surface area. Preferably, the polyamide support has a surface area which is less than 50 square meters per gram (50 m²/g).

In a further aspect of the invention there is provided a process for the preparation of a supported metallocene catalyst. In carrying out this aspect of the invention, there is provided a particulate catalyst support material in the form of a generally spheroidal polyamide particles having an average diameter within the range of 5–60 microns, preferably 10–30 microns. The polyamide support material is contacted with an alumoxane co-catalyst in an aromatic hydrocarbon solution under conditions in which the alumoxane and the polyamide react with a preponderance of the alumoxane being retained on the polyamide support. The alumoxane containing polyamide support particles are recovered from the aromatic hydrocarbon solvent. A stereospecific metallocene incorporating a metallocene ligand structure having sterically dissimilar cyclopentadienyl ring structures coordinated with the central transition metal atom as described above is dispersed within an aromatic hydrocarbon solvent, or, alternatively, in an aliphatic hydrocarbon such as hexane where sufficient hexane solubility is present. The metallocene solvent dispersion and the product produced by the reaction of the polyamide support material and the alumoxane are mixed together for a period of time sufficient to allow the metallocene to become reactively supported on the polyamide support to form a supported metallocene catalyst. This supported catalyst is then recovered from the aromatic solvent.

In a specific embodiment of the invention, the metallocene is characterized by the formula:

$$R''(Cp_aR_n)(Cp_bR'_m)MeQ_p \qquad (5)$$

In formula (5), $Cp_a$ is a substituted cyclopentadienyl ring, $CP_b$ is an unsubstituted or substituted cyclopentadienyl ring; each R is the same or different and is a hydrocarbyl radical having 1–20 carbon atoms; each R' is the same or different and is a hydrocarbyl radical having 1–20 carbon atoms; R" is a structural bridge between the cyclopentadienyl rings imparting stereorigidity to the catalyst and is selected from the group consisting of an alkylene radical having 1–4 carbon atoms or a substituted alkylene group such as a diphenyl methylene group, a silicon hydrocarbyl radical, a germanium hydrocarbyl radical, a phosphorus hydrocarbyl radical, a nitrogen hydrocarbyl radical, a boron hydrocarbyl radical, and an aluminum hydrocarbyl radical: Me is a group 4b, 5b, or 6b metal from the Periodic Table of Elements and each Q is a hydrocarbyl radical having 1–20 carbon atoms or is a halogen: p is from 0 to 3, m is from 0 to 3, n is from 1 to 4; and R'm is selected such that $(Cp_bR'_m)$ is a sterically different ring than $(Cp_aR_n)$. Preferably, $(Cp_aR_n)$ is a substituted or unsubstituted fluorenyl group having bilateral symmetry, Me is a titanium, zirconium, hafnium, or vanadium atom and the bridge R" is a methylene, ethylene, organosilyl, substituted methylene, propylidene, diphenyl methylene, or substituted ethylene radical. More preferably the metallocene ligand is configured so that $(Cp_aR_n)$ forms a fluorenyl group or substituted fluorenyl radical having bilateral symmetry and $(Cp_bR'_m)$ forms an alkyl substituted or unsubstituted cyclopentadienyl radical having bilateral symmetry. More specifically the metallocene ligand $R''(Cp_aR_n)(Cp_bR'_m)$ is an isopropylidene (cyclopentadienyl-1-fluorenyl) or diphenyl methylene (cyclopentadienyl-1-fluorenyl) ligand structure. Another embodiment of the invention involves polyamide-supported metallocenes which are isospecific. Such metallocenes include bridged bis-indenyl metallocenes and substituted cyclopentadienyl fluorenyl metallocenes which produce isotactic polypropylene.

DETAILED DESCRIPTION OF THE INVENTION

Figure 1:
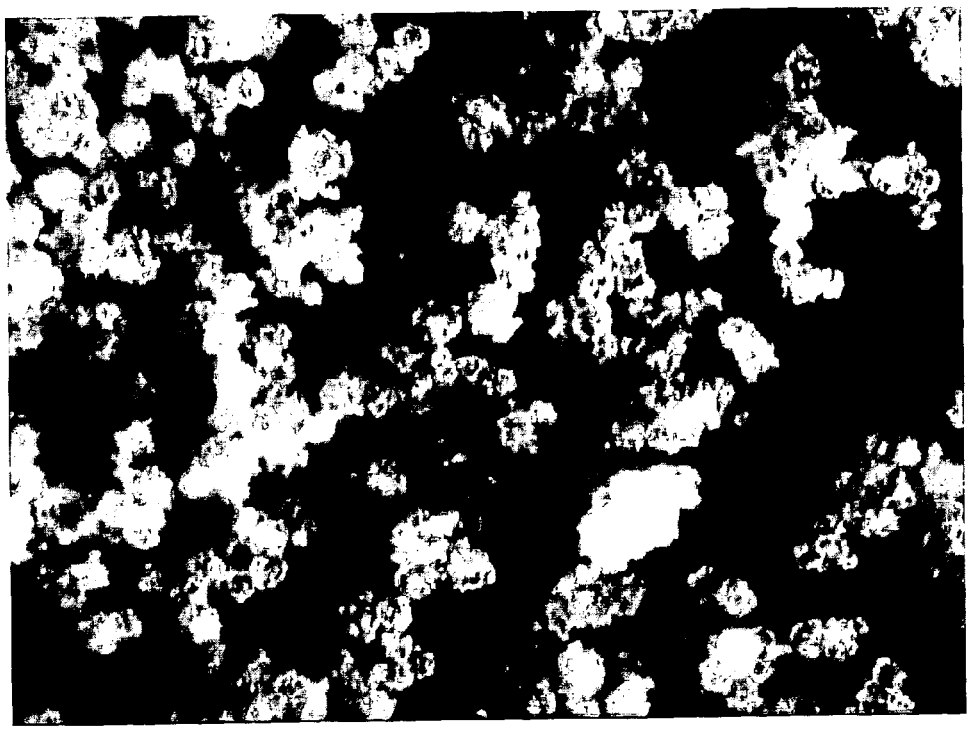
FIG. 1 is a photograph of spheroidal polyamide support particles employed in the present invention.

The present invention involves processes for the preparation and use of supported stereospecific metallocenes which are effective in stereospecific polymer propagation, especially syndiotactic polymer propagation, with low fouling production, to provide polymer fluff having a narrow well-defined particle size with minimal fines, good bulk density and flowability. Metallocene catalysts are often supported on various high surface area inorganic supports. Typically such supports have surface areas in excess of 100 m²/g. Silica and magnesium chloride are common supports although other supports such as alumina and various clay minerals may be used. The present invention departs from the conventional procedure of employing inorganic supports such as silica, and provides for the incorporation of a stereospecific metallocene catalyst on an organic support of well-controlled and relatively narrow particle size. The use of the organic polyamide support offers the advantage of producing a polymer fluff which does not incorporate minute particles of an inorganic species as is the case with traditional support such as those provided by silica or alumina particles, for instance. The use of the polyamide support provides for minimal fouling during resin manufacture and a well-defined particle size distribution while exhibiting catalyst activity and polymer fluff characteristics similar to those obtained with silica supported metallocene catalysts.

As noted previously the polyamide support is a fine namely defined powder having an average particle size within the range of 5–60 microns with a preferred average particle size within the range of 10–30 microns. The surface area is less than 50 m²/g, and normally less than about 20 m²/g. The polyamide particles are in a general sense of a spheroidal nature as contrasted with the angular granules of silica or other inorganics of a highly irregular shape sometimes used as catalyst supports or carriers. Prior to contacting the polyamide support with the stereospecific metallocene, the support is treated with an alumoxane co-catalyst. Alumoxane co-catalysts are also referred to as alumoxane or poly hydrocarbyl aluminum oxides. Such compounds include oligomeric or polymeric compounds having repeating units of the formula:

(6)

where R is an alkyl group generally having 1 to 5 carbon atoms. Alumoxanes are well known in the art and are generally prepared by reacting an organo aluminum compound with water, although other synthetic routes are known to those skilled in the art. Alumoxanes may be either linear polymers or they may be cyclic, as disclosed for example in U.S. Pat. No. 4,404,344. Thus, alumoxane is an oligomeric or polymeric aluminum oxy compound containing chains of alternating aluminum and oxygen atoms, whereby the aluminum carries a substituent, preferably an alkyl group. The exact structure of linear and cyclic alumoxanes is not known but is generally believed to be represented by the general formulae —(Al(R)—O—)-m for a cyclic alumoxane, and $R_2Al$—O—(Al(R)—O)m-$AlR_2$ for a linear compound wherein R independently each occurrence is a $C_1$–$C_{10}$ hydrocarbyl, preferably alkyl or halide and m is an integer ranging from 1 to about 50, preferably at least about 4. Alumoxanes also exist in the configuration of cage or cluster compounds Alumoxanes are typically the reaction products of water and an aluminum alkyl, which in addition to an alkyl group may contain halide or alkoxide groups. Reacting several different aluminum alkyl compounds, such as, for example, trimethylaluminum and tri-isobutyl aluminum, with water yields so-called modified or mixed alumoxanes. Preferred alumoxanes are methylalumoxane and methylalumoxane modified with minor amounts of other higher alkyl groups such as isobutyl. Alumoxanes generally contain minor to substantial amounts of starting aluminum alkyl compounds. The preferred co-catalyst, prepared either from trimethylaluminum or triethylaluminum, is sometimes referred to as poly (methyl aluminum oxide) and poly (ethyl aluminum oxide), respectively. The alumoxane co-catalyst is a predominately located on the surface of the polyamide support particles. The orientation of the alumoxane on the surface of the support particles functions to activate the subsequently added metallocene.

In carrying out the polymerization reaction the normal practice is to employ a scavenging agent or polymerization co-catalyst which is added to the polymerization reactor along with the supported metallocene. These scavengers can be generally characterized as organo metallic compounds of metals of Groups IA, IIA, and IIIB of the Periodic Table of Elements. As a practical matter, organo aluminum compounds are normally used as co-catalysts in polymerization reactions. Specific examples include triethyl aluminum, tri-isobutyl aluminum, diethyl aluminum chloride, diethyl aluminum hydride and the like. Scavenging co-catalysts normally employed in the invention include triethyl aluminum (TEAL) and tri-isobutyl aluminum (TIBAL). Tri-isobutyl aluminum can also be employed as a dispersant in which the supported catalyst is aged for a suitable period of time of from one minute to several days prior to use in the polymerization reaction as described in U.S. Pat. No. 6,239,058 to Shamshoum et al., the entire disclosure of which is incorporated herein by reference.

Metallocene catalysts that produce isotactic polyolefins are disclosed in U.S. Pat. Nos. 4,794,096 and 4,975,403 to Ewen. These patents disclose chiral, stereorigid metallocene catalysts that polymerize olefins to form isotactic polymers and are especially useful in the polymerization of highly isotactic polypropylene. As disclosed, for example, in the aforementioned U.S. Pat. No. 4,794,096, stereorigidity in a metallocene ligand is imparted by means of a structural bridge extending between cyclopentadienyl groups. Specifically disclosed in this patent are stereoregular hafnium metallocenes which may be characterized by the following formula:

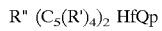
(7)

In formula (7), $(C_5(R')_4)$ is a cyclopentadienyl or substituted cyclopentadienyl group, R' is independently hydrogen or a hydrocarbyl radical having 1–20 carbon atoms, and R" is a structural bridge extending between the cyclopentadienyl rings. Q is a halogen or a hydrocarbon radical, such as an alkyl, aryl, alkenyl, alkylaryl, or arylalkyl, having 1–20 carbon atoms and p is 2.

Catalysts that produce syndiotactic polypropylene or other syndiotactic polyolefins and methods for the preparation of such catalysts are disclosed in U.S. Pat. No. 4,892,851 to Ewen. These catalysts are also bridged stereorigid metallocene catalysts, but, in this case, the catalysts have a structural bridge extending between dissimilar cyclopentadienyl groups and may be characterized by the formula:

(8)

In formula (8), Cp represents a cyclopentadienyl or substituted cyclopentadienyl ring, and R and R' represent hydrocarbyl radicals having 1–20 carbon atoms. R" is a structural bridge between the rings imparting stereorigidity to the catalyst. Me represents a transition metal, and Q a hydrocarbyl radical or halogen. $R'_m$ is selected so that $(CpR'_m)$ is a sterically different substituted cyclopentadienyl ring that $(CpR_n)$. In formula (8) n varies from 0–4 (0 designating no hydrocarbyl groups, i.e., an unsubstituted cyclopentadienyl ring), m varies from 14, and k is from 0–3. The sterically different cyclopentadienyl rings are configured in the ligand structure to produce a predominantly syndiotactic polymer rather than an isotactic polymer.

Specifically disclosed in U.S. Pat. No. 4,892,851 to Ewen, are bridged metallocene ligands having a dissimilar cyclopentadienyl group resulting from the reaction of 6, 6 dimethyl fulvene with a substituted cyclopentadiene, fluorene, to produce a ligand characterized by an isopropylidene bridge structure. Preferably, this ligand structure is characterized as having bilateral symmetry such as indicated by the isopropylidene (cyclopentadienyl fluorenyl) structure as shown below:

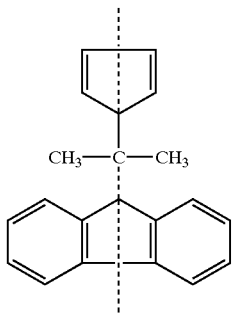

(9)

As indicated by Formula (9), the bilateral symmetry of the ligand structure is indicated by the balanced orientation about the broken line representing a plane of symmetry extending generally through the bridge structure and the transition metal atom.

While stereorigidity is normally established by a structural bridge as described above, an alternative approach is described in U.S. Pat. No. 5,243,002 to Razavi. This patent discloses the establishment of a stereorigid relationship imparted by a sterically-hindered relationship between substituted cyclopentadienyl rings which prevent rotation of the ring structures about their coordination axis. Alternatively, the cyclopentadienyl groups may be highly substituted such that a relatively low kinetic energy state is induced by the substituents in order to prevent rotation rings about their coordination axis at the temperature of the catalyst.

Catalyst systems useful in the formation of isotactic polyolefins include the racemic bis-indenyl compounds of the type disclosed in U.S. Pat. No. 4,794,096 to Ewen. The bis(indenyl) ligand structures may be unsubstituted or they may be substituted as described below. Other isospecific metallocenes useful in carrying out the invention are based upon cyclopentadienyl fluorenyl ligand configurations which are substituted to provide a lack of bilateral symmetry. Catalysts of this nature are disclosed in U.S. Pat. No. 5,416,228 to Ewen et al. Here, the ligand structure is configured so that one cyclopentadienyl group of a bridged ligand has a bulky group on one and only one of the distal positions of a cyclopentadienyl ring. Typical of such metallocenes is isopropylidene (3-tertiary butyl cyclopentadienyl fluorenyl) zirconium dichloride.

Other isospecific metallocenes based on cyclopentadienyl fluorenyl ligand structures are disclosed in EPO 0881,236A1 to Razavi. Here, the ligand structures are characterized by bridged cyclopentadienyl and fluorenyl groups in which the cyclopentadienyl group is substituted at both proximal and distal positions. The distal substituent is preferably a bulky group such as a tertiary butyl group, and the proximal substituent is a less bulky group such as a methyl group which may be either vicinal or non-vicinal to the distal substituent. The fluorenyl group may be substituted or unsubstituted with up to eight substituent groups but preferably are unsubstituted at the positions which are distal to the bridgehead carbon atom. Specifically disclosed in EPO 881,236A1 are isopropylidene(3-tertiary butyl, 5-methyl cyclopentadienyl fluorenyl) zirconium dichloride and isopropylidene(3-tertiary butyl, 2-methyl cyclopentadienyl fluorenyl) zirconium dichloride.

Yet other isospecific metallocenes based upon bis (fluorenyl) ligand structures are disclosed in U.S. Pat. No. 5,945,365 to Reddy. Here, the ligand structure is characterized by two bridged fluorenyl groups with 1 or 2 substituents at distal positions on each fluorenyl group with one group of substituents being located transversely from the other with respect to a plane of bilateral symmetry extending through the bridge group. Preferred ligand structures are bridged bisfluorenyl ligands substituted at the 4,4' positions by methyl, methoxy, isopropyl or tertiary butyl groups. For a further description of isospecific metallocenes, reference is made to the aforementioned U.S. Pat. Nos. 4,794,096, 5,416,228 and 5,945,365 and EPO 881,236A1, the entire disclosures of which are incorporated herein by reference.

In experimental work respecting the present invention, syndiospecific and isospecific metallocene catalysts were supported on a polyamide support having an average particle size of 20 microns. The polyamide particles are available from ATOFINA Chemicals, Inc. under the designation Orgasol 3502(d). Orgasol 3502(d) and similar polyamide particles are produced by the polymerization of caprolactame either alone or with lauryllactame. The polyamide support particles are characterized by a density slightly in excess of 1 gram per cubic centimeter and a melting point of about 177° C. The polyamide particles are characterized as spheroidal, since while they are not perfect spheres, they conform generally to a spheroidal shape having surface imperfections on their outer surfaces. FIG. 1 is a photograph of Orgasol 3502(d) polyamide particles shown with a magnification of 20×.

The experimental work with the polyamide supports was carried out employing a syndiospecific metallocene, diphenyl methylene (cyclopentadienyl) (fluorenyl) zirconium dichloride. The isospecific catalyst employed in the experimental work was rac dimethyl silyl bis (2-methyl, 4-phenyl indenyl) zirconium dichloride. In preparing the polyamide supported metallocene catalysts, the polyamide support particles were dried under a nitrogen stream for 14 hours at 60° C. The polyamide support was then employed in a dispersion formed of 10 grams of the polyamide and 80 milliliters of toluene. After the polyamide dispersion was stirred to disperse the polyamide particles within the toluene carrier, methylalumoxane (MAO) was added in an amount to provide a weight ratio of MAO to polyamide of 0.7:1. The methylalumoxane 23.6 grams of MAO solution (30 wt. % in toluene) was added slowly to the polyamide dispersion. The two components were mixed at room temperature and the evolution of gas (presumably methane) occurred. Stirring of the mixture of the two components continued until gas evolution ceased. Thereafter the mixture was refluxed at 115° C. for about four hours and then allowed to cool. The supernate toluene was decanted and the residual solids were washed three times with 100 milliliters of toluene. Following decantation of the last toluene wash, the solid MAO polyamide particles were dispersed in 100 milliliters of hexane and left overnight. The hexane layer was then decanted and the solids were washed two times with 100 milliliter portions of hexane and then dried under a vacuum for two hours. The MAO-supported polyamide particles were then recovered as a fine white powder.

In order to support the metallocene on the polyamide particles, metallocene loading was accomplished by providing a dispersion of the stereospecific metallocene in toluene. In each case, a metallocene loading of a 2 wt. % on the MAO polyamide support was employed. By way of example of the metallocene loading procedure, about 5 grams of the MAO-reacted polyamide support were added to a round-bottomed flask along with 80 milliliters of toluene. On hundred milligrams of the metallocene was added in 20 milliliters of toluene. The contents were added in a 20 milliliter Wheaton vial and the contents stirred for about one hour. The solids were washed on a frit sequentially with three 50 milliliter portions of toluene followed by three 50 milliliter portions of hexane. The final catalyst was dried in vacuum to give a light purple powder weighing 4.53 grams. Mineral oil was then added to this solid to provide a total mineral oil dispersion of 47.878 grams containing about 9.5% solids.

In the comparative experimental work carried out using a silica supported catalyst, the syndiospecific metallocene, Ph2C(Cp)(Flu)ZrC12 was supported on a silica support having a weight ratio of MAO to silica of 0.7/1. In preparation of methylaluminoxane on the silica support, the silica, Sunsphere H121, available from Asahi Glass Company, was dried in an oven at 150° C. for 24 hrs. The dried silica was placed in a 3-necked 1 liter round-bottomed flask equipped with a reflux condenser, magnetic stir bar and sealed using rubber septa in a glove box. The flask containing the silica was removed from the glove box and connected to a double manifold schlenk line (argon/vacuum). Toluene was added to the silica and the slurry was allowed to homogenize for 10 minutes. Clear and gel-free methylaluminoxane (140 milliliters of 30 wt % MAO in toluene) was added slowly. The slurry was heated to reflux and maintained for 4 hours at which time the solution was allowed to cool to ambient temperature and the solids allowed to settle. The toluene solution was decanted from the flask and the remaining wet solids were washed sequentially with three 450 milliliter portions of toluene. The wet MAO/silica was washed with three 450 milliliter portions of hexane and the solids were dried for 3 hours in vacuo to yield a dry white powder (111 grams) containing a small amount of residual solvent.

In the preparation of the silica supported metallocene catalyst, five grams of the MAO on the silica support and 50 milliliters of dry, deoxygenated toluene were added to a 100 milliliter round-bottomed flask. One hundred mg of diphenylmethylene (cyclopentadienyl) (fluorenyl) zirconium dichloride and 10 milliliters of toluene were added to a 20 milliliter Wheaton vial. The metallocene catalyst was added to the slurry containing the MAO on silica via cannula and the contents was stirred for 1 hr. The solids were then allowed to settle and the mother liquor was decanted using a cannula. The solids were washed on a frit sequentially with three 50 milliliter portions of toluene followed by three 50 milliliter portions of hexane. The final catalyst was dried in vacuo for 1 hr to give a blue solid weighing 4.8 grams. To the dried catalyst was added 46.3 grams of purified mineral oil (dry & deoxygenated) to make a final catalyst slurry containing 9.5% solids.

Polymerizations were performed in liquid propylene using a stirred, autoclave type reactor with either 2 liter or 4 liter capacity. For a 2 liter reactor, the reactor was charged with 360 grams of propylene and 5 mmoles of hydrogen. The catalyst (36 mgs) was flushed into the reactor with tributyl aluminum (TIBAL) for the syndiospecific catalyst and triethyl aluminum (TEAL) for the isospecific catalyst and 360 grams of propylene at room temperature. The reactor temperature was increased quickly to about 60–70° C. and the polymerization was allowed to proceed for one hour. Residual propylene and hydrogen were then flashed from the reactor and the polymer fluff was allowed to dry in air overnight. Catalyst activity values are reported as the grams of polymer produced per gram of catalyst used per hour.

Bulk density measurements were conducted by weighing the unpacked contents of a 100 milliliter graduated cylinder containing polymer powder and the results were reported as grams per cubic centimeter. Polymer melt flow was determined in accordance with ASTM D-1238 at 230° C. with a 2.16 Kg mass. Polymer powder was stabilized for the test with approximately 1 mg of 2,6-ditert-butyl-4-methylphenol (BHT) with the melt flow reported as gram/10 min.

Fluff particle size distribution was recorded on a mechanical sieve shaker. A plot of particle size versus cumulative amount (0–100%) was used to estimate the D10, D50 and D90. Fines are defined as the % by weight of particles less than about 106 $\mu$m in size. Catalyst and silica particle size distributions were measured using a Malvern Particle Size Analyzer.

TABLE 1

| Run No. | Activity (g/g/h) | MF (dg/min) | BD (g/cc) | Fouling (mg/g) | % Fines (<106 um) |
|---------|------------------|-------------|-----------|----------------|-------------------|
| 1 | 11,000 | 1.6 | 0.26 | — | — |
| 2 | 19,500 | 2.3 | 0.36 | 1.2 | 0 |
| 3 | 2,528 | 2.3 | .30 | 3.37 | .16 |
| 4 | 18,600 | 1.8 | .40 | 1.0 | 0 |

The results of the polymerization runs for the above-described polyamide-supported catalyst and the silica-supported catalyst are set forth in Table 1. Run 1 was carried out with is the syndiospecific catalyst supported on the polyamide support. Run 2 indicates the results obtained for this same catalyst but with the catalyst first being aged in a tri-isobutyl aluminum solution. In the aging procedure 36 milligrams of catalyst was aged in the presence of 36 milligrams of TIBAL for a period of 12 hours.

Run number 3 indicates the results achieved for the above identified iso-specific metallocene without aging. Run number 4 indicates the results achieved with the syndiospecific catalyst supported on the above identified silica support, again without aging. In each case, the weight ratio of the MAO to the support was 0.7. The metallocene loadings for Runs 1 and 2 were 2%. For the iso-specific metallocene reported in Run 3 the metallocene loading was 3.0%. In Runs 1, 2 and 4 the co-catalyst employed was TIBAL. In Run 3 the co-catalyst employed was TEAL. The ratio of co-catalyst to catalyst weight ratio of a co-catalyst to catalyst was 3:1 for each of Runs 1, 2 and 4, and was 2:1 for Run 3. In the run carried out employing the polyamide supports the hydrogen usage was 97 mmoles for the syndiospecific catalyst but only 10 mmoles for the iso-specific catalyst.

As shown in Table 1, the activity for the syndiospecific polyamide supported catalyst was good and when aged in TIBAL actually exceeded the activity of the silica-supported catalyst. The melt flow and bulk density compared favorably with the silica-supported catalyst and the fouling was about the same as or less than the silica-supported catalyst. The activity for the isospecific metallocene supported on the polyamide support was substantially less than for the syndiospecific catalyst. Based upon this experimental data it is preferred to employ the polyamide support in conjunction with the syndiospecific catalyst, although as indicated, polymer production is achieved with the isospecific catalyst. Thus the polyamide support can be employed with the isospecific catalyst where it is desired to avoid an inorganic silica residue in the polymer fluff.

Figure 2:
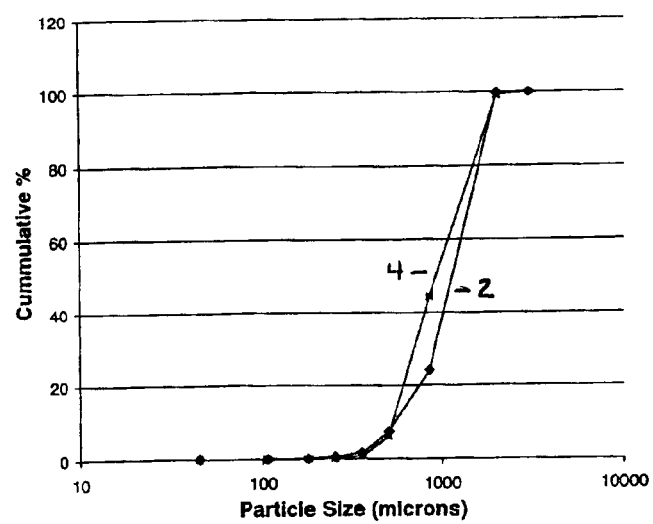
FIG. 2 is a graph illustrating the particle size distribution of a syndiotactic polypropylene fluff produced employing a syndiospecific polyamide supported catalyst and with the fluff produced by the corresponding syndiospecific catalyst supported on a particulate silica support.

FIG. 2 shows graphs of the cumulative particle size distribution % plotted on the ordinate versus particle size in microns plotted on the abscissa for syndiotactic polypropylene fluff produced employing the unaged polyamide-supported catalyst indicated by curve 2 and the silica-supported syndiospecific catalyst indicated by curve 4. As can be seen by an examination of FIG. 2 the particle size of distribution for the syndiotactic polymer produced by the polyamide supported syndiospecific catalyst is narrow and well-defined with a very few fines in the lower particle sizes. Thus the polyamide supported catalyst of the present invention is as effective as the corresponding silica supported catalyst, but offers the added advantage of providing predominantly organic catalyst residue in the polymer fluff.

Having described specific embodiments of the present invention, it will be understood that modifications thereof may be suggested to those skilled in the art, and it is intended to cover all such modifications as fall within the scope of the appended claims.

What is claimed is:

1. A process for the polymerization of an ethylenically unsaturated monomer comprising:

(a) providing a supported metallocene catalyst comprising a stereospecific metallocene catalyst component supported on a polyamide support comprising spheroidal polyamide support particles having an average particle size within the range of 5–60 microns and having an alkylalumoxane co-catalyst component supported on said polyamide support by reaction of said alkylalumoxane and said polyamide support; and (b) contacting said catalyst in a polymerization reaction zone with an ethylenically unsaturated monomer containing three or more carbon atoms or a substituted vinyl compound and maintaining said reaction under polymerization conditions to polymerize said monomer to produce a stereoregular polymer.

2. The process of claim 1 wherein said polyamide support particles have an average particle size within the range of 10–30 microns.

3. The process of claim 1 wherein said stereospecific metallocene catalyst component comprises at least two stereospecific metallocenes.

4. The process of claim 1 wherein said ethylenically unsaturated monomer is a $C_3$ or $C_4$ alpha olefin.

5. The process of claim 4 wherein said alpha olefin is propylene.

6. The process of claim 5 wherein said alkylalumoxane is predominantly supported on the outer surface of said polyamide particles.

7. The process of claim 4 wherein said catalyst is contacted with ethylene to produce an ethylene propylene co-polymer.

8. The process of claim 1 wherein said metallocene is characterized by the formula:

$$R''(Cp_aR_n)(Cp_bR'_m)MeQ_p$$

wherein $Cp_a$ is a substituted cyclopentadienyl ring, $Cp_b$ is an unsubstituted or substituted cyclopentadienyl ring; each R is the same or different and is a hydrocarbyl radical having 1–20 carbon atoms; each R' is the same or different and is a hydrocarbyl radical having 1–20 carbon atoms; R'' is a structural bridge between the cyclopentadienyl rings imparting stereorigidity to the catalyst and is selected from the group consisting of an alkylene radical having 1–4 carbon atoms, a silicon hydrocarbyl radical, a germanium hydrocarbyl radical, a phosphorus hydrocarbyl radical, a nitrogen hydrocarbyl radical, a boron hydrocarbyl radical, and an aluminum hydrocarbyl radical; Me is a group 4b, 5b, or 6b metal from the Periodic Table of Elements; each Q is a hydrocarbyl radical having 1–20 carbon atoms or is a halogen; p is from 0 to 3, m is from 0 to 3, n is from 1 to 4; and wherein $R'_m$ is selected such that $(Cp_bR'_m)$ is a sterically different ring than $(Cp_aR_n)$.

9. The process of claim 8 wherein R is selected such that $(Cp_aR_n)$ forms a substituted or unsubstituted fluorenyl group.

10. The process of claim 9 wherein Me is titanium, zirconium, hafnium, or vanadium.

11. The process of claim 10 wherein R'' is a methylene, ethylene, organosilyl, substituted methylene, or substituted ethylene radical.

12. The process of claim 11 wherein $R''(CpR_n)(CpR'_m)$ forms an isopropylidene (cyclopentadienyl-1-fluorenyl) radical or a diphenylmethylene (cyclopentadienyl-1-fluorenyl) radical.

13. The process of claim 10 wherein R is selected such that $(Cp_aR_n)$ forms a substituted fluorenyl radical having bilateral symmetry and R' is selected such that $(CP_bR_m)$ forms an alkyl substituted or unsubstituted cyclopentadienyl radical having bilateral symmetry.

14. The process of claim 1 wherein $R''(CpR_n)(CpR'_m)$ forms an isopropylidene (cyclopentadienyl-1-fluorenyl) radical or a diphenylmethylene (cyclopentadienyl-1-fluorenyl).

15. The process of claim 1 wherein said polyamide particles have an average surface area of less than 50 $M^2/g$.

16. The process of claim 1 wherein said polyamide particles have an average surface area of less than 20 $M^2/g$.

* * * * *